(12) United States Patent
Chen et al.

(10) Patent No.: US 7,457,728 B2
(45) Date of Patent: Nov. 25, 2008

(54) METHOD AND SYSTEM FOR COMPLEX EVENT PROCESSING

(75) Inventors: Pin-Chan Chen, Taichung (TW); Joseph Huang, Taipei (TW); Chih-Hao Hsu, Taipei (TW)

(73) Assignee: Institute for Information Industry, Taipei (TW)

( * ) Notice: Subject to any disclaimer, the term of this patent is extended or adjusted under 35 U.S.C. 154(b) by 28 days.

(21) Appl. No.: 11/641,708

(22) Filed: Dec. 20, 2006

(65) Prior Publication Data

US 2008/0109824 A1 May 8, 2008

(30) Foreign Application Priority Data

Nov. 8, 2006 (TW) .............................. 95141277 A (51) Int. Cl.
*G06F 19/00* (2006.01)

(52) U.S. Cl. ......................................... 702/189; 716/5
(58) Field of Classification Search ................. 702/189, 702/81, 183–185, 83, 33–36, 40, 82, 84, 702/108, 117–121, 170, 172; 324/500, 537, 324/750, 753, 751; 340/635; 716/5; 706/48
See application file for complete search history.

(56) References Cited

U.S. PATENT DOCUMENTS

2007/0255529 A1* 11/2007 Biazetti et al. .............. 702/186

* cited by examiner

*Primary Examiner*—Edward Raymond
(74) *Attorney, Agent, or Firm*—Birch, Stewart, Kolasch & Birch, LLP (57) ABSTRACT

A method for complex event processing is disclosed. An event correlation engine detects various event correlation rules to analyze events to be detected and then retrieves event processing languages from an event definition storage module to implement and receive other relative events using a process engine.

33 Claims, 5 Drawing Sheets

METHOD AND SYSTEM FOR COMPLEX EVENT PROCESSING

BACKGROUND OF THE INVENTION

1. Field of the Invention

The invention relates to event processing, and more particularly to a method and system for complex event processing.

2. Description of the Related Art

Event driven architecture is a software architecture that defines how systems can be engineered and designed to detect and respond to events. Three general types of event processing simple, stream, and complex, are often used in conjunction in mature event-driven architectures.

With respect to complex event processing (CEP), CEP allows considers simple and ordinary event patterns to infer that a complex event has occurred. CEP evaluates a confluence of the events and before acting. The events (notable or ordinary) may cross event types and occur over a long period of time. The event correlation may be casual, temporal, or spatial. CEP requires sophisticated event interpreters, event pattern definition and matching, and correlation techniques. CEP is commonly used to detect and respond to business anomalies, threats, and opportunities.

Figure 1:
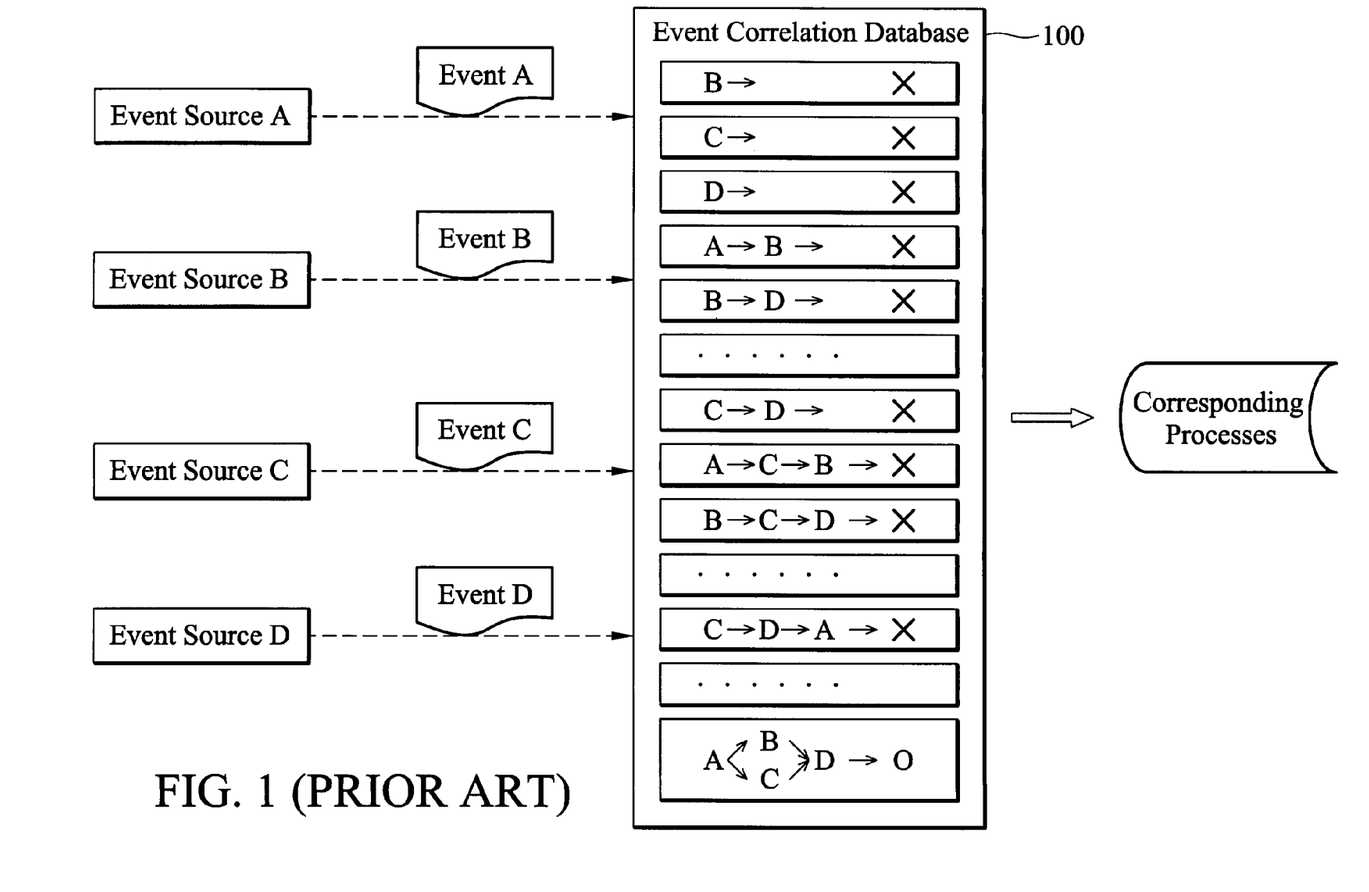
FIG. 1 is a workflow of an instance of conventional complex event processing.

FIG. 1 is a workflow of an instance of conventional complex event processing.

Event sources A, B, C, and D comprise an event emitter (not shown), respectively, detecting and transmitting received events. Event correlation engine 100 receives events from event sources A, B, C, and D and determines whether the received events are required according to correlation rules. Herein, correlation rules are defined to sequentially receive event A, events B and C simultaneously, and subsequently, event D.

Referring to FIG. 1, event correlation engine 100 receiving any one of the events A, B, C, and D does not correspond to the correlation rules. Event correlation engine 100 receiving any two of the events A, B, C, and D does not correspond to the correlation rules. Event correlation engine 100 receiving any three of the events A, B, C, and D does not correspond to the correlation rules. Only event correlation engine 100 receiving event A, events B and C simultaneously, and event D corresponds to the correlation rules, and a corresponding process is performed.

CEP monitors systems or web events using distributed components to retrieve event states, passively obtain outside information, and determine, using a rule agent, whether predefined correlation rules correspond. CEP operations, however, are passive, and lack substantial event-driven detection and transition and analysis of garbage data.

Thus, an improved method and system for complex event processing, capable of improving activity of event-driven and detection and reducing unessential detection, transmission, filtering to enhance system performance is desirable.

BRIEF SUMMARY OF THE INVENTION

Methods for complex event processing are provided. An exemplary embodiment of a method for complex event processing comprises the following. At least one event is received and stored in an input queue. It is determined whether the event corresponds to predefined correlation rules. If the event does not correspond to the predefined correlation rules, the event is stored in an output queue for output. If the event corresponds to the predefined correlation rules, it is then determined whether a lacking event is detected. If required events have been received, a complex event is generated based on the received event and is stored in the output queue for output. If a lacking event is detected, event processing language corresponding to the event is retrieved using a coordination engine to enable a process engine to perform a process corresponding to the event and receive required events.

Systems for complex event processing are provided. An exemplary embodiment of a system for complex event processing comprises a client and a server. The client comprises an event source for generating an event. The server further comprises an input queue, an output queue, a process engine, a correlation engine, an event definition, a correlation engine, and a coordination engine. The input queue receives the event. The correlation engine comprises multiple predefined correlation rules. The event definition storage module comprises event processing languages corresponding to multiple events. The correlation engine determines whether the event corresponds to at least one correlation rule, and if the event does not correspond, stores the event in the output queue, if the event does correspond, determines whether a lacking event is detected, if not, a complex event based on the received event is generated, and the complex event for output is stored. If a lacking event is not detected, the coordination engine, retrieves event processing language corresponding to the event using a coordination engine to enable a process engine to perform a process corresponding to the event and receives required events.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Several exemplary embodiments of the invention are described with reference to FIGS. 2 through 4, which generally relate to complex event processing. It is to be understood that the following disclosure provides various different embodiments as examples for implementing different features of the invention. Specific examples of components and arrangements are described in the following to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various described embodiments and/or configurations.

The invention discloses a method and system for complex event processing, improving activity of event-driven and detection and reducing unessential detection, transmission, filtering to enhance system performance. Additionally, various external data sources and query interfaces are applied to determination of complex events, actively retrieving required information for re-loadable operations.

Figure 2:
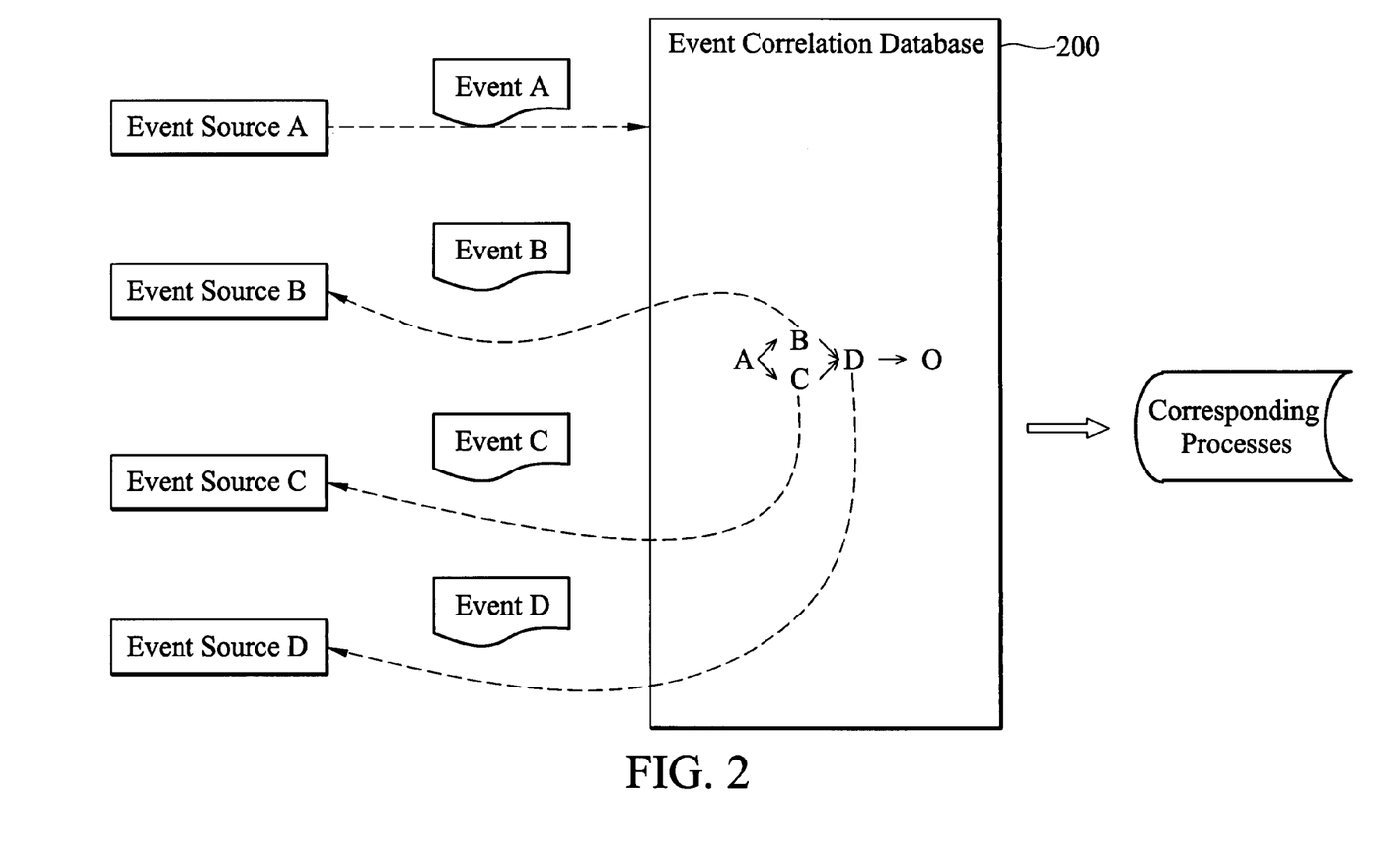
FIG. 2 is a workflow of an embodiment of a complex event processing.

FIG. 2 is a workflow of an embodiment of a complex event processing.

Event sources A, B, C, and D comprise an event emitter (not shown), respectively, detecting and transmitting received events. Event correlation engine 200 receives events from event sources A, B, C, and D and determines whether the received events are required according to correlation rules. In this embodiment, correlation rules are defined to sequentially receive event A, events B and C simultaneously, and subsequently, event D.

As shown in FIG. 2, event correlation engine 200 abandons or returns other received events or disables event sources B, C, and D from sending events before receiving event A. When event A is received, event correlation engine 200 abandons or returns other received events or disables event source D from sending events before receiving events B and C. When event D is received, a corresponding process is performed.

Figure 3:
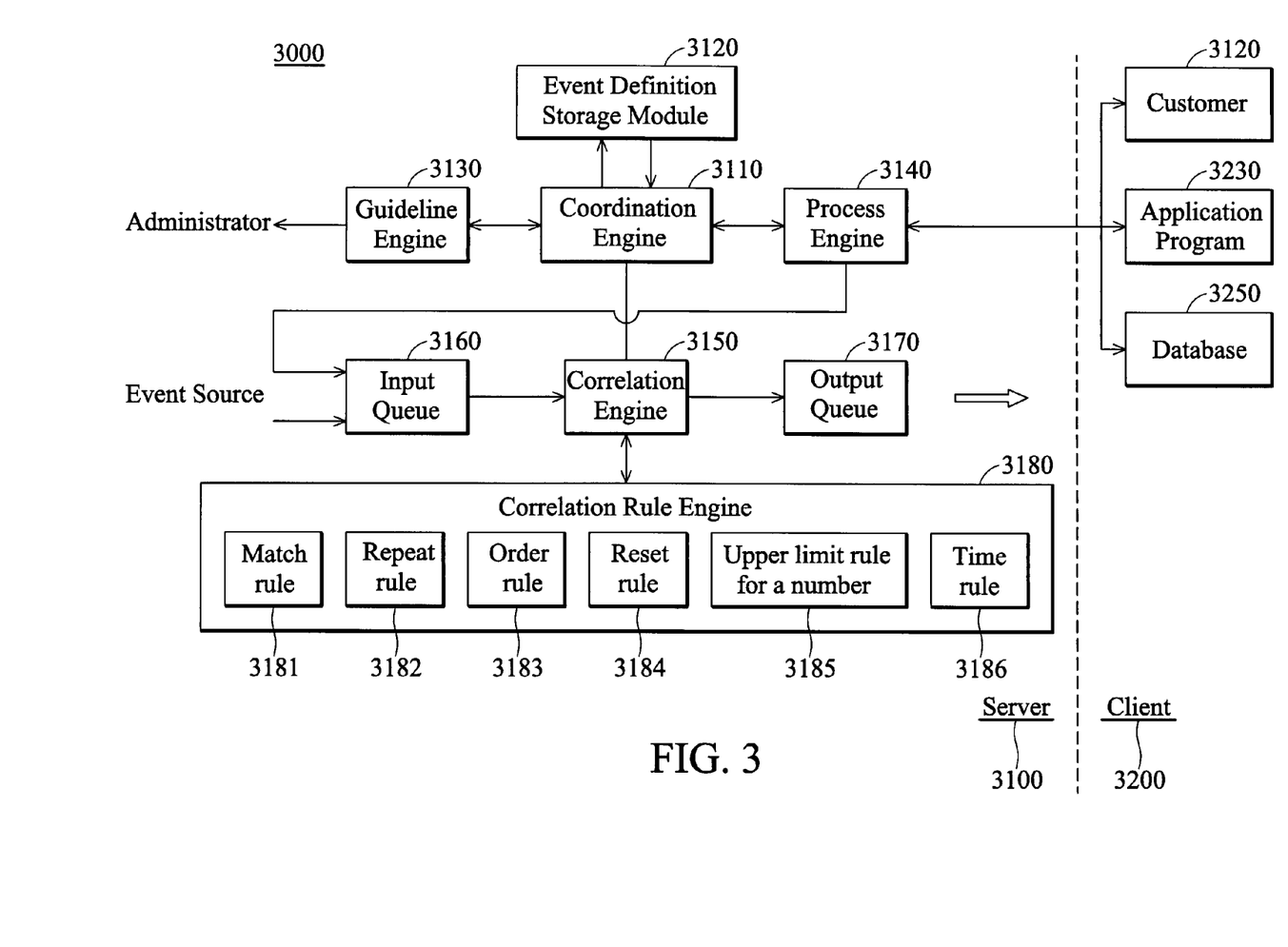
FIG. 3 is a schematic view of an embodiment of a system for complex event processing.

FIG. 3 is a schematic view of an embodiment of a system for complex event processing.

Complex event processing system 3000 comprises a server 3100 and a client 3200. Server 3100 comprises a coordination engine 3110, an event definition storage module 3120, a guideline engine 3130, a process engine 3140, a correlation engine 3150, an input queue 3160, an output queue 3170, and correlation rule engine 3180. Client 3200 comprises a customer 3210, an application program 3230, and a database 3250.

Coordination engine 3110 coordinates guideline engine 3130 to retrieve activation rules of correlation rules, queries event information stored in event definition storage module 3120, and requests that process engine 3140 perform corresponding processes.

Event definition storage module 3120 provides event field definitions and compositions and definitions of event processing languages. Event field definitions and compositions comprise extensible markup language (XML), databases, specified field data sources, and so forth. The event processing languages enables subscribing or unsubscribing to an event emitter and provides application program interfaces and calls for libraries and web services.

Guideline engine 3130, automatically set by a program or manually determined by an administrator, determines whether events are actively collected. A guideline may comprise a set of guidelines comprising multiple guidelines. Additionally, guideline engine 3130 can be applied to enhance system functionality and interaction.

Process engine 3140 communicates with external components to activate event delivery components or obtains external data and provides connections between event emitters, customer 3210, application program 3230, and database 3250.

Correlation engine 3150 detects following lacking events based on currently defined correlation rules to maintain the correlation rules and recover previously suspended event sources when the lacking events are received.

Correlation rule engine 3180 comprises multiple predefined correlation rules, at least comprising, but not limited to, a match rule 3181, a repeat rule 3182, an order rule 3183, a reset rule 3184, an upper limit rule for a number 3185, and a time rule 3186.

Match rule 3181 defines whether a single event is confirmed (whether event A is received, for example). Repeat rule 3182 defines whether an event repeatedly received is confirmed (whether event A is repeatedly received, for example). Order rule 3183 defines whether events sequentially received are confirmed (whether event A and then event B are received (A→B) or event A and then event C are received (A→C), for example). Reset rule 3184 defines received events are reset if a required event to be monitored is not received within a predetermined time. Upper limit rule for a number 3185 defines whether a specified amount of numbers are confirmed (whether two events A and one event B are received (A, A, B) or two events B and one event C are received (B, B, C), for example). Time rule 3186 defines whether an event generated with a time segment (Timer: within) or a time interval (Timer: interval) or at a predetermined time (Timer: at) is confirmed.

Additionally, each event source provides an event emitter (not shown) to initially filter data contents for data mining, comprising event detection, compositions of event message format, event transmission, event recording, and event subscribing.

Figure 4A:
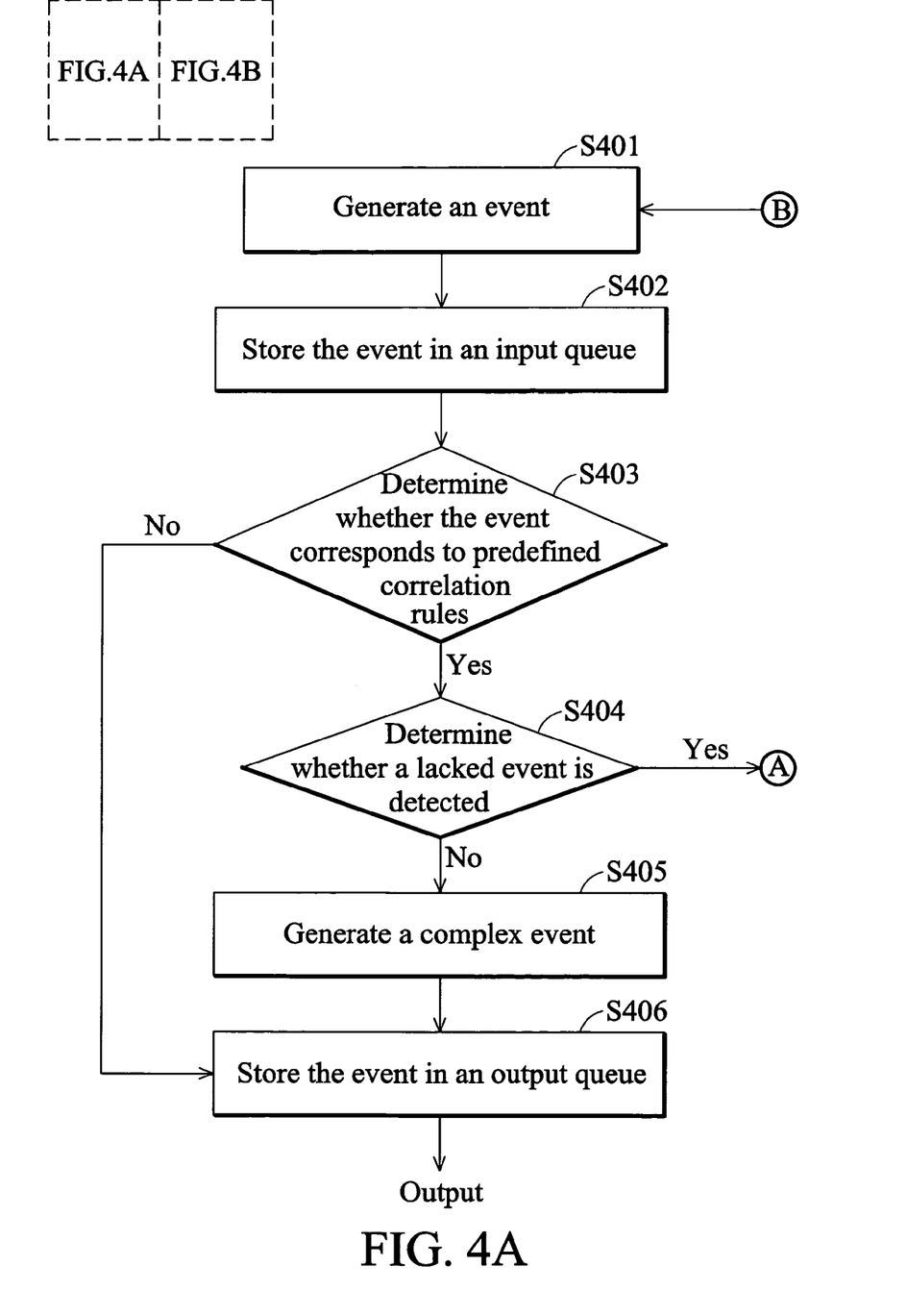
FIGS. 4A and 4B are flowcharts of an embodiment of a method for complex event processing.
Figure 4B:
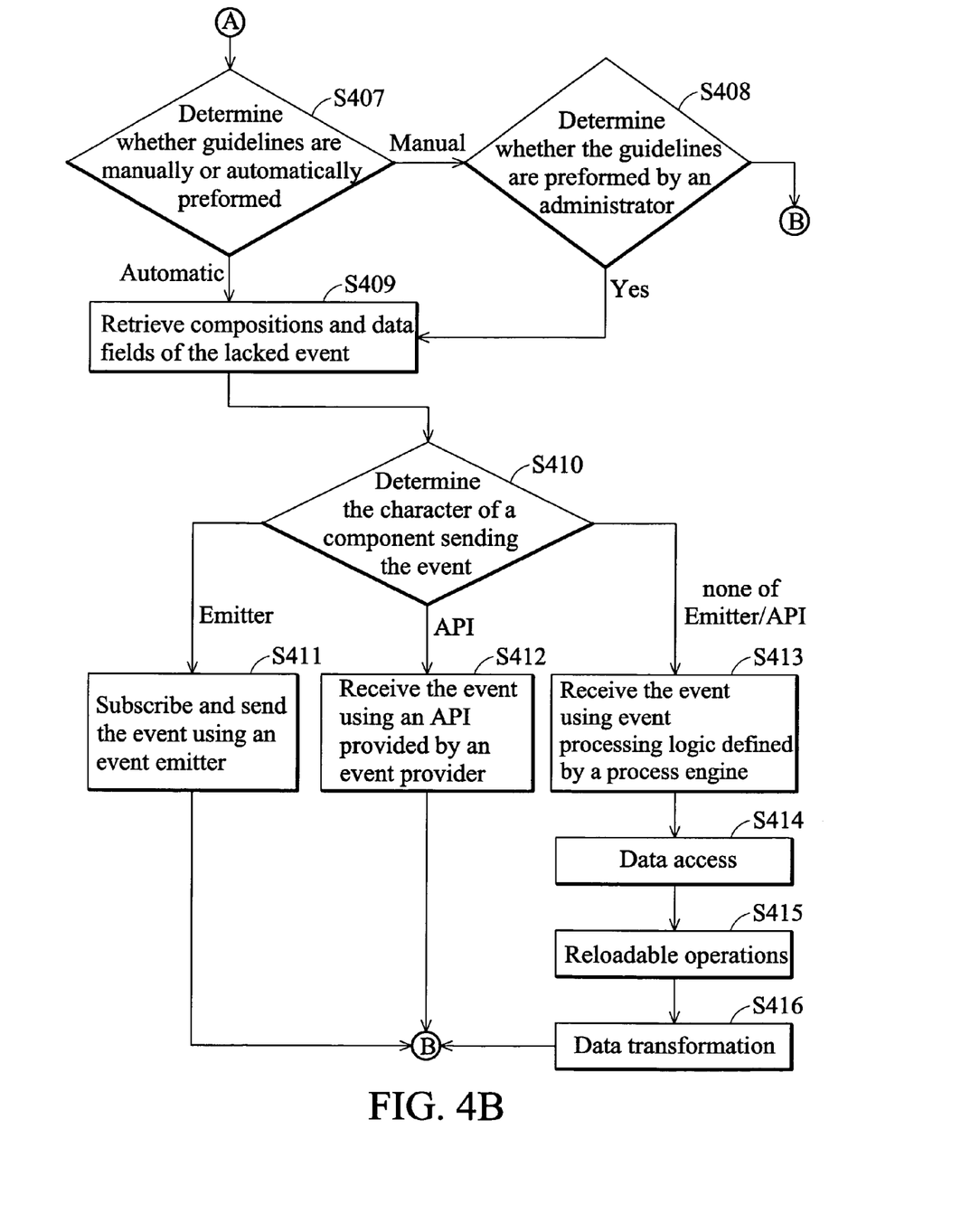

FIGS. 4A and 4B are flowcharts of an embodiment of a method for complex event processing.

Referring to FIGS. 3, 4A, and 4B, when an event source generates an event (step S401), the event is stored in input queue 3160 (step S402). Next, correlation engine 3150 determines whether the event corresponds to predefined correlation rules (comprising an assembling rule, a time rule, and so forth) according to correlation rule engine 3180 (step S403). If the event does not correspond, the event is stored in output queue 3170 for output (step S406). If the event does correspond, correlation engine 3150 determines whether a lacking event is detected (step S404). If required events have been received, a complex event is generated based on the event (step S405) and is stored in output queue 3170 for output (step S406).

If a lacking event is detected, correlation engine 3150 notifies coordination engine 3110, enabling guideline engine 3130 to determine whether guidelines corresponding to the correlation rules are manually or automatically performed (step S407). If the guidelines corresponding to the correlation rules are manually performed, guideline engine 3130 requests an administrator to determine whether the guidelines are performed (step S408). Next, coordination engine 3110 retrieves compositions and data fields of the lacking event using event definition storage module 3120 (step S409) and determines the character of a component sending the event (step S410).

If the component acts as an event emitter of an event source, process engine 3140 subscribes to the event and sending the event using the event emitter (step S411). If the component acts as an application interface (API), process engine 3140 receives the event using the application interface (API) provided by an event provider (step S412). If the component is not the event emitter or the application interface (API), the event is received using event processing logic defined by process engine 3140 (step S413) and data access (step S414), re-loadable operations (step S415), and data transformation (step S416) are implemented on the event.

As shown in steps S410 ~ S413, a component sending events can be an event emitter, an application interface (API), or others (a graphical user interface (GUI) or not providing an interface). Referring to Attachment 1, the component acts as an event emitter. The event emitter of an event source residing on a client can detect, deliver, catch, and subscribe to events. A server can publish events to which a client can subscribe, and unsubscribe.

Referring to Attachment 2, the component acts as an application interface (API). A provider residing in an event source of a client provides an application interface (API), a library, and others, and retrieves a query from and responds to a server with an answer. Referring to Attachment 3, the component acts as a graphical user interface (GUI). A user of a client implements an event processing to a server via the graphical user interface (GUI). Referring to Attachment 4, no interface is provided for an event source of a client so an event processing is directly implemented to a server.

An embodiment of a method and system for complex event processing provides a timestamp in an event and, when a server publics or subscribes an event to a client, transmits the timestamp to an event source (event source A, for example) of the client. Event source A checks the timestamp, determines whether the event acts as a delay message, and checks whether a previous event based on the timestamp has been recorded in historical records to prevent event delay. When the timestamp is confirmed, event source A activates event notification or subscription.

An embodiment of a system for complex event processing constrains the event correlation engine to not detecting events generated based on various complex event correlation rules but retrieves event processing language from an event definition storage module using an event coordination engine to receive required events using a process engine.

An embodiment of a method for complex event processing substantially reduces the number of detection and processing events to prevent event overloading of the system and further reduce system reaction time. Additionally, extra high performance computer devices are not required.

Further, an embodiment of a method and system for complex event processing processes complex events based on definitions stored in the event definition storage module and utilizes various external data sources and query interfaces to actively retrieve required information for re-loadable operations, thus, garbage data operations can be reduced to enlarge system operating capacity. Additionally, external data can be retrieved from a database, an application, an agent, and so forth. The substitution and dynamic processing characteristics of the external data source can be applied to enhance system processing ability. Active monitor and reminders are further provided to automatically or manually process (detection or suspense) events.

Methods and systems of the present disclosure, or certain aspects or portions of embodiments thereof, may take the form of program code (i.e., instructions) embodied in media, such as floppy diskettes, CD-ROMS, hard drives, firmware, or any other machine-readable storage medium, wherein, when the program code is loaded into and executed by a machine, such as a computer, the machine becomes an apparatus for practicing embodiments of the disclosure. The methods and apparatus of the present disclosure may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing and embodiment of the disclosure. When implemented on a general-purpose processor, the program code combines with the processor to provide a unique apparatus that operates analogously to specific logic circuits.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for complex event processing, comprising:
   receiving and storing at least one event in an input queue;
   determining whether the event corresponds to predefined correlation rules;
   if the event does not correspond to the predefined correlation rules, storing the event in an output queue for output;
   if the event corresponds to the predefined correlation rules, determining whether a lacking event is detected;
   if required events have been received, generating a complex event based on the received event;
   storing the complex event in the output queue for output;
   if a lacking event is detected, retrieving event processing language corresponding to the event using a coordination engine to enable a process engine to perform a process corresponding to the event and receive required events;
   determining the character of a component sending the event;
   if the component acts as an event emitter of an event source, subscribing the event and sending the event using the event emitter;
   if the component acts as an application interface (API), receiving the event using the application interface (API) provided by an event provider; and
   if the component is not the event emitter or the application interface (API), receiving the event using event processing logic defined by a process engine and implementing data access, re-loadable operations, and data transformation to the event.

2. The method for complex event processing as claimed in claim 1, further comprising:
   if another lacking event is detected, notifying the coordination engine to enable a guideline engine to determine whether guidelines corresponding to the correlation rules are manually or automatically performed; and
   the coordination engine retrieving compositions and data fields of the lacking event using an event definition storage module.

3. The method for complex event processing as claimed in claim 2, wherein if the guidelines corresponding to the correlation rules are manually performed, the guideline engine requests an administrator to determine whether the guidelines are performed.

4. The method for complex event processing as claimed in claim 1, wherein the event emitter is installed on the event source of a client to detect, send, and receive events and subscribe to events.

5. The method for complex event processing as claimed in claim 4, wherein a server publishes events and subscribes and unsubscribes the client to events of the event source.

6. The method for complex event processing as claimed in claim 1, wherein the application interface (API) is installed on a client of the event source and retrieves a query request from a server and responds with the query request to the server.

7. The method for complex event processing as claimed in claim 1, wherein the component acts as a graphical user interface (GUI) and is installed on a client and a user of the client implements an event processing on a server via the graphical user interface (GUI).

8. The method for complex event processing as claimed in claim 1, wherein the event source is installed on a client and directly implements an event processing on a server without any interfaces.

9. The method for complex event processing as claimed in claim 1, further comprising:
   providing a timestamp in the event;
   when a server publics or subscribes an event to a server, transmitting the timestamp to an event source of the client;
   the event source checking the timestamp to determine whether the event is a delay message;
   determining whether a historical record comprises previous events corresponding to the timestamp; and
   when the timestamp is confirmed, the event source activating event notifying or subscribing.

10. The method for complex event processing as claimed in claim 1, wherein the correlation rules at least comprise a match rule, a repeat rule, an order rule, a reset rule, an upper limit rule for a number, and a time rule.

11. The method for complex event processing as claimed in claim 10, wherein the time rule defines whether an event generated with a time segment or a time interval or at a predetermined time corresponds to the correlation rules.

12. A system for complex event processing, comprising:
   a client, comprising an event source for generating an event; and
   a server, further comprising:
   an input queue, receiving the event;
   an output queue;
   a process engine;
   a correlation engine, comprising multiple predefined correlation rules;
   an event definition storage module, comprising event processing languages corresponding to multiple events;
   a correlation engine, determining whether the event corresponds to at least one correlation rule, if the event does not correspond, storing the event in the output queue, if the event does correspond, determining whether a lacking event is detected, if not detected, generating a complex event based on the received event, and storing the complex event for output;
   a coordination engine, if a lacking event is not detected, retrieving event processing language corresponding to the event using a coordination engine to enable a process engine to perform a process corresponding to the event and receive required events;
   the coordination engine determines the character of a component sending the event;
   if the component acts as an event emitter of an event source, the process engine subscribes to the event and sends the event using the event emitter;
   if the component acts as an application interface (API), the process engine receives the event using the application interface (API) provided by an event provider; and
   if the component is not the event emitter or the application interface (API), the process engine receives the event using event processing logic defined by a process engine and implements data access, re-loadable operations, and data transformation to the event.

13. The system for complex event processing as claimed in claim 12, further comprising a guideline engine providing multiple predefined guidelines, wherein:
   if another lacking event is detected, the guideline engine notifies the coordination engine to determine whether guidelines corresponding to the correlation rules are manually or automatically performed; and
   the coordination engine receives compositions and data fields of the lacking event using an event definition storage module.

14. The system for complex event processing as claimed in claim 13, wherein if the guidelines corresponding to the correlation rules are manually performed, the guideline engine requests an administrator to determine whether the guidelines are performed.

15. The system for complex event processing as claimed in claim 12, wherein the event emitter is installed on the event source of a client to detect, send, and receive events and subscribe to events.

16. The system for complex event processing as claimed in claim 15, wherein the server publishes events and subscribes and unsubscribes the client to events of the event source.

17. The system for complex event processing as claimed in claim 16, wherein the application interface (API) is installed on a client of the event source and retrieves a query request from a server and responds with the query request to the server.

18. The system for complex event processing as claimed in claim 12, wherein the component acts as a graphical user interface (GUI) and is installed on a client and a user of the client implements an event processing on a server via the graphical user interface (GUI).

19. The system for complex event processing as claimed in claim 12, wherein the event source directly implements an event processing on a server without any interfaces.

20. The system for complex event processing as claimed in claim 12, wherein:
   the server provides a timestamp in the event and, when issuing or subscribing an event to the server, transmits the timestamp to an event source of the client; and
   the event source checks the timestamp to determine whether the event is a delay message, determines whether a historical record comprises previous events corresponding to the timestamp, and, when the timestamp is confirmed, activates event notification or subscription.

21. The system for complex event processing as claimed in claim 12, wherein the correlation rules at least comprise a match rule, a repeat rule, an order rule, a reset rule, an upper limit rule for a number, and a time rule.

22. The system for complex event processing as claimed in claim 21, wherein the time rule defines whether an event generated with a time segment or a time interval or at a predetermined time corresponds to the correlation rules.

23. A computer-readable storage medium storing a computer program providing a method for complex event processing, comprising using a computer to perform the steps of:
   receiving and storing at least one event in an input queue;
   determining whether the event corresponds to predefined correlation rules;
   if the event does not correspond to the predefined correlation rules, storing the event in an output queue for output;
   if the event corresponds to the predefined correlation rules, determining whether a lacking event is detected;
   if required events have been received, generating a complex event based on the received event;
   storing the complex event in the output queue for output;
   if a lacking event is detected, retrieving event processing language corresponding to the event using a coordination engine to enable a process engine to perform a process corresponding to the event and receive required events;
   determining the character of a component sending the event;

if the component acts as an event emitter of an event source, subscribing the event and sending the event using the event emitter;
if the component acts as an application interface (API), receiving the event using the application interface (API) provided by an event provider; and
if the component is not the event emitter or the application interface (API), receiving the event using event processing logic defined by a process engine and implementing data access. re-loadable operations, and data transformation to the event.

24. The computer-readable storage medium as claimed in claim 23, further comprising:
if another lacking event is detected, notifying the coordination engine to enable a guideline engine to determine whether guidelines corresponding to the correlation rules are manually or automatically performed; and
the coordination engine receiving compositions and data fields of the lacking event using an event definition storage module.

25. The computer-readable storage medium as claimed in claim 24, wherein if the guidelines corresponding to the correlation rules are manually performed, the guideline engine requests an administrator to determine whether the guidelines are performed.

26. The computer-readable storage medium as claimed in claim 25, wherein the event emitter is installed on the event source of a client to detect, send, and receive events and subscribe to events.

27. The computer-readable storage medium as claimed in claim 26, wherein a server publishes events a client subscribes to and unsubscribes from events and event sources.

28. The computer-readable storage medium as claimed in claim 23, wherein the application interface (API) is installed on a client of the event source and retrieves a query request from a server and responds with the query request to the server.

29. The computer-readable storage medium as claimed in claim 23, wherein the component acts as a graphical user interface (GUI) and is installed on a client and a user of the client implements an event processing on a server via the graphical user interface (GUI).

30. The computer-readable storage medium as claimed in claim 23, wherein the event source is installed on a client and directly implements an event processing on a server without any interfaces.

31. The computer-readable storage medium as claimed in claim 23, further comprising:
providing a timestamp in the event;
when a server publics or subscribes an event to a server, transmitting the timestamp to an event source of the client;
the event source checking the timestamp to determine whether the event is a delay message;
determining whether a historical record comprises previous events corresponding to the timestamp; and
when the timestamp is confirmed, the event source activating event notifying or subscribing.

32. The computer-readable storage medium as claimed in claim 23, wherein the correlation rules at least comprise a match rule, a repeat rule, an order rule, a reset rule, an upper limit rule for a number, and a time rule.

33. The computer-readable storage medium as claimed in claim 32, wherein the time rule defines whether an event generated with a time segment or a time interval or at a predetermined time corresponds to the correlation rules.

* * * * *